United States Patent
Zyulkyarov et al.

(10) Patent No.: US 9,015,404 B2
(45) Date of Patent: Apr. 21, 2015

(54) PERSISTENT LOG OPERATIONS FOR NON-VOLATILE MEMORY

(71) Applicant: Intel Corporation, Santa Clara, CA (US)

(72) Inventors: Ferad Zyulkyarov, Barcelona (ES); Qiong Cai, Barcelona (ES)

(73) Assignee: Intel Corporation, Santa Clara, CA (US)

( * ) Notice: Subject to any disclaimer, the term of this patent is extended or adjusted under 35 U.S.C. 154(b) by 302 days.

(21) Appl. No.: 13/630,548

(22) Filed: Sep. 28, 2012

(65) Prior Publication Data

US 2014/0095766 A1    Apr. 3, 2014

(51) Int. Cl.
*G06F 9/06*     (2006.01)
*G06F 9/30*     (2006.01)
*G06F 12/02*    (2006.01)
*G06F 11/14*    (2006.01)

(52) U.S. Cl.
CPC .................................. *G06F 11/1471* (2013.01)

(58) Field of Classification Search
None
See application file for complete search history.

(56) References Cited

U.S. PATENT DOCUMENTS

| | | | | |
|---|---|---|---|---|
| 7,774,646 B2 * | 8/2010 | Smith et al. | ...................... | 714/13 |
| 8,051,328 B1 * | 11/2011 | Smith et al. | ...................... | 714/15 |
| 8,069,366 B1 * | 11/2011 | Wenzel | .......................... | 714/6.3 |
| 8,261,125 B2 * | 9/2012 | Wenzel | .......................... | 714/6.3 |
| 2005/0223186 A1 | 10/2005 | Belevich et al. | | |
| 2009/0043948 A1 | 2/2009 | Wittenburg et al. | | |
| 2009/0300271 A1 | 12/2009 | Yang et al. | | |
| 2010/0318722 A1 | 12/2010 | Liu et al. | | |
| 2012/0042202 A1 * | 2/2012 | Wenzel | .......................... | 714/6.3 |
| 2014/0052891 A1 * | 2/2014 | Zyulkyarov et al. | .......... | 711/102 |

FOREIGN PATENT DOCUMENTS

WO    2014/051744 A1    4/2014

OTHER PUBLICATIONS

International Search Report and Written Opinion received for PCT Patent Application No. PCT/US2013/045606, mailed on Jul. 22, 2013, 3 pages.
Volos et al., "Mnemosyne: Lightweight Persistent Memory", Mar. 5-11, 2011, 13 pages.
Condit et al., "Better I/O Through Byte-Addressable, Persistent Memory", Oct. 11-14, 2009, 14 pages.

* cited by examiner

*Primary Examiner* — Kevin Verbrugge
(74) *Attorney, Agent, or Firm* — Chapin IP Law, LLC (57) ABSTRACT

In an embodiment, a first delayed persistence operation to store information in a log contained in a non-volatile memory (NVM) may be performed. The information may include, for example, a current value of a variable contained in the NVM. A second delayed persistence operation to store information in the variable may be performed. A third delayed persistence operation to store information in the NVM that indicates the log is cleared may be performed. A flush operation may be performed, for example after the first, second, and third delayed persistence operations. The flush operation may commit information associated with at least one of the first, second, or third delayed persistence operations to the NVM.

20 Claims, 6 Drawing Sheets

```
void log(void* var)
{
    nvstore logBuffer[ind].address,  var;
    nvstore logBuffer[ind].value,   *var;
    nvstore ind, ind + 1; // ind++
}
```
⎫
⎬ 310
⎭

```
void clear_log()
{
    nvstore ind, 0;
}
```
⎫
⎬ 312
⎭

```
bool is_log_clear()
{
    return ind == 0;
}
```
⎫
⎬ 314
⎭

PERSISTENT LOG OPERATIONS FOR NON-VOLATILE MEMORY

BACKGROUND

A computing device may use one or more storage systems to store information. The information may include, for example, data and/or executable instructions. The storage systems may include a primary storage and a secondary storage. A primary storage may be a storage that is directly accessible to a processor that may be contained in the computing device. The processor may access the primary storage via a memory bus that may contain provisions for transferring information between the processor and the primary storage. A secondary storage may be a storage that may not be directly accessible to the processor. Here, information may be transferred between the processor and the secondary storage via one or more input/output (I/O) channels that may be part of an I/O bus.

BRIEF DESCRIPTION OF THE DRAWINGS

The accompanying drawings, which are incorporated in and constitute a part of this specification, illustrate one or more embodiments described herein and, together with the description, explain these embodiments. In the drawings.

DETAILED DESCRIPTION

The following detailed description refers to the accompanying drawings. The same reference numbers in different drawings may identify the same or similar elements. Also, the following detailed description does not limit the invention.

A computing device (e.g., smart phone, tablet, ultrabook, server) may include a non-volatile memory (NVM) that the computing device may use to store data that is to survive after power is lost to the computing device. For example, a computing device may contain a processor and an NVM. The processor may use the NVM to store an address book for a user of the computing device. The address book may contain information (e.g., names, phone numbers) that may be associated with contacts that the user often calls using the computing device. By storing the address book in the NVM, the information may be persisted such that the information may be retained in the NVM after power is lost to the computing device. The processor may retrieve the persisted information from the NVM after power is restored to the computing device.

Figure 1:
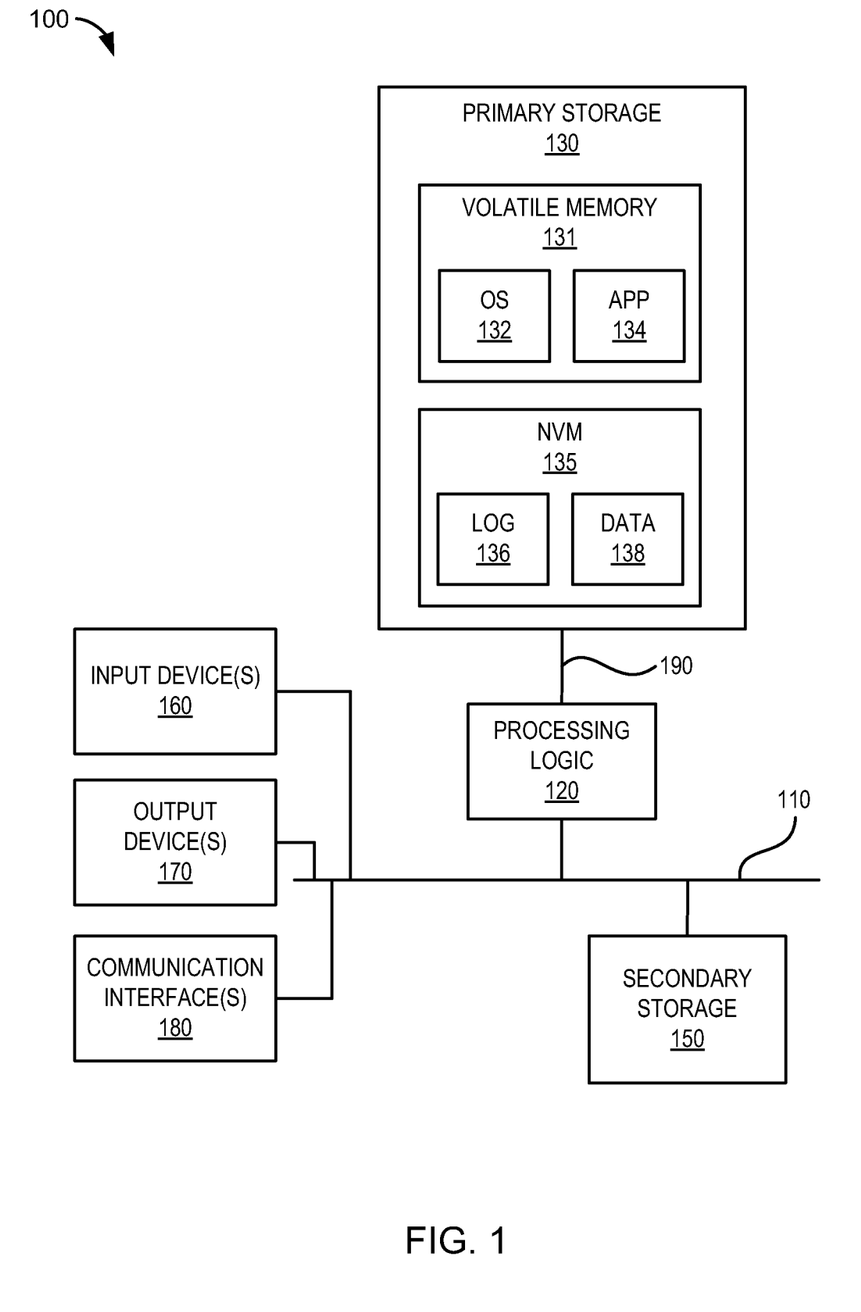
FIG. 1 illustrates a block diagram of an example embodiment of a computing device.

FIG. 1 illustrates a block diagram of an example embodiment of a computing device 100 that may include an NVM 135. The NVM 135 may be part of a primary storage 130 associated with the computing device 100. Referring to FIG. 1, computing device 100 may include various components such as, for example, processing logic 120, primary storage 130, secondary storage 150, one or more input devices 160, one or more output devices 170, and one or more communication interfaces 180.

It should be noted that FIG. 1 illustrates an example embodiment of computing device 100. Other embodiments of computing device 100 may include more components or fewer components than the components illustrated in FIG. 1. Further, the components may be arranged differently than as illustrated in FIG. 1. For example, in an embodiment of computing device 100, secondary storage 150 may be contained at a remote site that provides "cloud" storage. The site may be accessible to computing device 100 via a communications network, such as, for example, the Internet. A communication interface 180 may be used to interface the computing device 100 with the communications network.

Also, it should be noted that functions performed by various components contained in other embodiments of computing device 100 may be distributed among the components differently than as described herein.

Computing device 100 may include an I/O bus 110 that may enable communication among components in computing device 100, such as, for example, processing logic 120, secondary storage 150, one or more input devices 160, one or more output devices 170, and one or more communication interfaces 180. The communication may include, among other things, transferring information (e.g., control information, data) between the components.

Computing device 100 may include a memory bus 190 that may enable information, which may be stored in primary storage 130, to be transferred between processing logic 120 and primary storage 130. The information may include instructions and/or data that may be executed, manipulated, and/or otherwise processed by processing logic 120.

Processing logic 120 may include logic for interpreting, executing, and/or otherwise processing information. The information may include information that may be stored in, for example, primary storage 130 and/or secondary storage 150. In addition, the information may include information that may be acquired (e.g., read, received) by one or more input devices 160 and/or communication interfaces 180.

Processing logic 120 may include a variety of heterogeneous hardware. For example, the hardware may include some combination of one or more processors, microprocessors, field programmable gate arrays (FPGAs), application specific instruction set processors (ASIPs), application specific integrated circuits (ASICs), complex programmable logic devices (CPLDs), graphics processing units (GPUs), and/or other types of processing logic that may, for example, interpret, execute, manipulate, and/or otherwise process the information. Processing logic 120 may comprise a single core or multiple cores. An example of a processor that may be used to implement processing logic 120 is the Intel Xeon processor available from Intel Corporation, Santa Clara, Calif.

Secondary storage 150 may include storage that may be accessible to processing logic 120 via I/O bus 110. The storage may store information for processing logic 120. The information may be executed, interpreted, manipulated, and/or otherwise processed by processing logic 120. The information may include, for example, computer-executable instructions and/or data that may implement one or more embodiments of the invention.

Secondary storage 150 may include, for example, one or more storage devices that may store the information. The storage devices may be volatile or non-volatile. Storage devices that may be included in secondary storage 150 may include, for example, magnetic disk drives, optical disk drives, random-access memory (RAM) disk drives, flash drives, solid-state drives (SSDs), and/or other storage devices. The information may be stored on one or more non-transitory tangible computer-readable media contained in the storage devices. Examples of non-transitory tangible computer-readable media that may be contained in the storage devices may include magnetic discs, optical discs, and/or memory devices. An example of a memory device may be a non-volatile random access memory (RAM) device.

Input devices 160 may include one or more devices that may be used to input information into computing device 100. The devices may include, for example, a keyboard, computer mouse, microphone, camera, trackball, gyroscopic device (e.g., gyroscope), mini-mouse, touch pad, stylus, graphics tablet, touch screen, joystick (isotonic or isometric), pointing stick, accelerometer, palm mouse, foot mouse, puck, eyeball controlled device, finger mouse, light pen, light gun, neural device, eye tracking device, steering wheel, yoke, jog dial, space ball, directional pad, dance pad, soap mouse, haptic device, tactile device, neural device, multipoint input device, discrete pointing device, and/or some other input device. The information may include spatial (e.g., continuous, multi-dimensional) data that may be input into computing device 100 using, for example, a pointing device, such as a computer mouse. The information may also include other forms of data, such as, for example, text that may be input using a keyboard.

Output devices 170 may include one or more devices that may output information from computing device 100. The devices may include, for example, a cathode ray tube (CRT), plasma display device, light-emitting diode (LED) display device, liquid crystal display (LCD) device, vacuum florescent display (VFD) device, surface-conduction electron-emitter display (SED) device, field emission display (FED) device, haptic device, tactile device, printer, speaker, video projector, volumetric display device, plotter, touch screen, and/or some other output device. Output devices 170 may be directed by, for example, processing logic 120, to output the information from computing device 100. The information may be presented (e.g., displayed, printed) by output devices 170. The information may include, for example, text, graphical user interface (GUI) elements (e.g., windows, widgets, and/or other GUI elements), audio (e.g., music, sounds), and/or other information that may be presented by output devices 170.

Communication interfaces 180 may include logic for interfacing computing device 100 with, for example, one or more communications networks and enable computing device 100 to communicate with one or more entities (e.g., nodes) coupled to the communications networks. The communications networks may include, for example, the Internet, wide-area networks (WANs), local area networks (LANs), 3G and/or 4G networks. Communication interfaces 180 may include one or more transceiver-like mechanisms that may enable computing device 100 to communicate with entities coupled to the communications networks. Examples of communication interfaces 180 may include a built-in network adapter, network interface card (NIC), Personal Computer Memory Card International Association (PCMCIA) network card, card bus network adapter, wireless network adapter, Universal Serial Bus (USB) network adapter, modem, and/or other device suitable for interfacing computing device 100 to a communications network.

Primary storage 130 may include one or more non-transitory tangible computer-readable media that may store, for example, computer-executable instructions and/or data. Primary storage 130 may be accessible to processing logic 120 via memory bus 190. The computer-executable instructions and/or data may implement operating system (OS) 132 and application (APP) 134. The computer-executable instructions may be executed, interpreted, and/or otherwise processed by processing logic 120. The computer-executable instructions and/or data may include computer-executable instructions and/or data that may implement one or more embodiments of the invention.

Primary storage 130 may include a volatile memory 131 and a non-volatile (NVM) 135. The volatile memory 131 may include a random access memory and/or a serial access memory. The volatile memory 131 may be implemented using one or more volatile memory devices that may store information. The information may include executable instructions that may be executed by processing logic 120 and/or data that may be manipulated by processing logic 120. The volatile memory devices may include for example, dynamic random access memory (DRAM) devices, static random access memory devices, double-data-rate (DDR) synchronous random access memory, Thyristor random access memory (TRAM), and/or other types of volatile memory devices. Volatile memory 131 may contain OS 132 and APP 134.

OS 132 may be a conventional operating system that may implement various conventional operating system functions that may include, for example, (1) scheduling one or more portions of APP 134 to run on (e.g., be executed by) the processing logic 120, (2) managing primary storage 130, and (3) controlling access to various components in computing device 100 (e.g., input devices 160, output devices 170, communication interfaces 180, secondary storage 150) and information received and/or transmitted by these components.

Examples of operating systems that may be used to implement OS 132 may include the Linux operating system, Microsoft Windows operating system, the Symbian operating system, Mac OS operating system, and the Android operating system. A distribution of the Linux operating system that may be used is Red Hat Linux available from Red Hat Corporation, Raleigh, N.C. Versions of the Microsoft Windows operating system that may be used include Microsoft Windows Mobile, Microsoft Windows 7, Microsoft Windows Vista, and Microsoft Windows XP operating systems available from Microsoft Inc., Redmond, Wash. The Symbian operating system is available from Accenture PLC, Dublin, Ireland. The Mac OS operating system is available from Apple, Inc., Cupertino, Calif. The Android operating system is available from Google, Inc., Menlo Park, Calif.

APP 134 may be a software application that may run (execute) under control of OS 132 on computing device 100. APP 134 and/or OS 132 may contain provisions for processing transactions that may involve storing information in NVM 135. APP 134 and/or OS 132 may further include provisions for maintaining log 136. These provisions may be implemented using data and/or computer-executable instructions contained in APP 134 and/or OS 132.

NVM 135 may include, for example, a random access memory and/or serial memory. NVM 135 may be implemented using one or more non-volatile memory devices that may store information. The information may include, for example, executable instructions that may be executed by processing logic 120 and/or data that may be manipulated by processing logic 120. The non-volatile memory devices may include, for example, read-only memory (ROM) devices, programmable ROM (PROM) devices, erasable PROM (EPROM) devices, electrically-erasable PROM (EEPROM) devices, flash memory devices, ferro-electric random access memory (FeRAM) devices, magneto-resistive random access memory (MRAM) devices, phase-change memory (PCM)

devices, PCM with switch (PCMS) devices, nanowire based memory devices, ferro-electric transistor random access memory (FeTRAM) devices, resistive random access memory (RRAM) devices, and/or other types of non-volatile memory devices. NVM 135 may contain data 138 and/or log 135.

Data 138 may contain information (e.g., data) associated with transactions that may be processed by APP 134 and/or OS 132. Log 136 may contain information that may be used to restore information contained in data 138. Log 136 may be implemented in many different ways (e.g., as a linked list, stack data structure, array). Details of information that may be contained in data 138 and log 136 will be discussed further below.

It should be noted that while log 136 and data 138 are shown in FIG. 1 as being contained in NVM 135 in primary storage 130, other variations are possible. For example, log 136 and/or data 138 may be contained in an NVM that may be included in secondary storage 150. In another example, data 138 and/or log 136 may be stored in an NVM that may be accessible via a communications network (e.g., in cloud storage). Here, the data 138 and/or log 136 may be accessible via one or more communication interfaces 180. Note that the above example variations include possible variations for storing log 136 and/or data 138 and that other variations may be possible.

Information may be stored in NVM 135 using delayed persistence. Delayed persistence may involve indicating that information is to be persisted in NVM 135 but not indicating when the information is actually persisted in NVM 135. An operation (e.g., an executable instruction) that employs delayed persistence to write information to NVM 135 may complete execution prior the actual writing of the information to NVM 135.

In contrast to delayed persistence, immediate persistence may involve persisting information immediately to NVM 135. Here, an operation that employs immediate persistence to write information to NVM 135 may not complete until after the information is written (committed) to NVM 135.

For example, suppose computing device 100 (FIG. 1) implements (1) an "nvstore" instruction that employs delayed persistence to write information to NVM 136 and (2) an "nvflush" instruction that employs immediate persistence to immediately persist information, written by an "nvstore" instruction, to NVM 135. The computing device 100 may first execute an "nvstore" instruction to write information to a location in NVM 135. Note that since the "nvstore" instruction employs delayed persistence to write the information to NVM 135, the information may actually be written to the location sometime after the "nvstore" instruction completes execution. Thus, completion of execution of the "nvstore" instruction does not guarantee that the information has been actually written to the location in NVM 135 and an instruction that reads the location in NVM 135 after the "nvstore" instruction completes execution may not necessarily read the information that was written by the "nvstore" instruction.

Now suppose the computing device 100 executes an "nvflush" instruction after the "nvstore" instruction and that the "nvflush" instruction executes prior to the information actually being written to the location in NVM 135. Since the "nvflush" instruction employs immediate persistence and is executed after the "nvstore" instruction, the information associated with the "nvstore" instruction is written to the location in NVM 135 before the "nvflush" instruction completes execution. Thus, an instruction that reads the location after the "nvflush" instruction executes will read the information that was written by the "nvstore" instruction.

Figure 2:
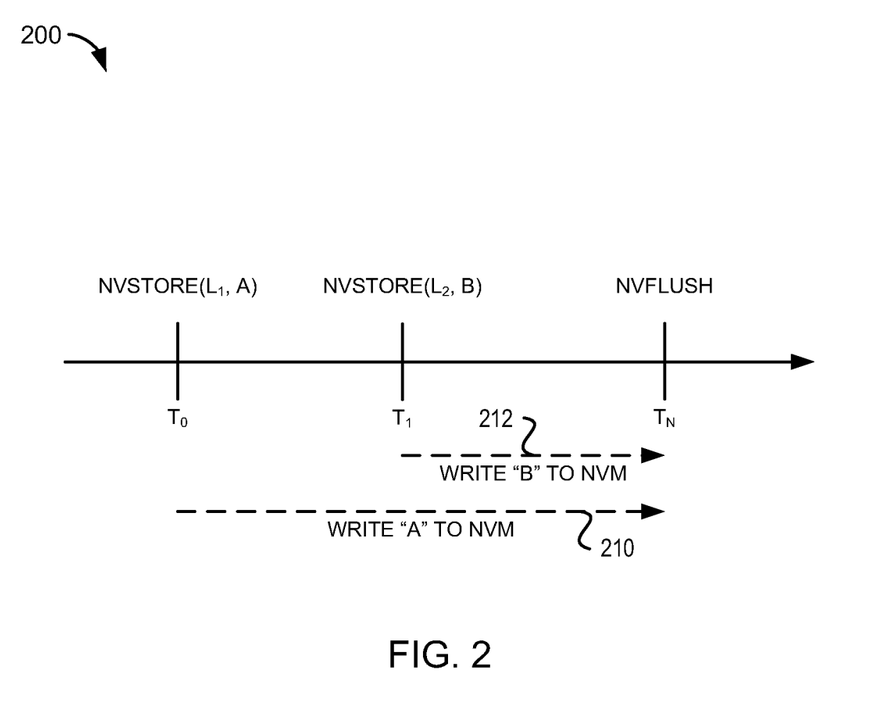
FIG. 2 illustrates a timeline associated with an example storing of data in a non-volatile memory (NVM) using delayed persistence.

FIG. 2 illustrates a timeline 200 that may help explain an operation of the above-described "nvstore" and "nvflush" instructions. Referring to FIG. 2, at time $T_0$ computing device 100 may execute a first "nvstore" instruction to store information (represented by "A") at a first location (represented by "$L_1$") in NVM 135. At time $T_1$ computing device 100 may execute a second "nvstore" instruction to store data (represented by "B") at a second location (represented by "$L_2$") in NVM 135. At time $T_n$ computing device 100 executes an "nvflush" instruction to ensure that the information written by the first and second "nvstore" instructions are committed (actually written) to NVM 135.

Line 210 indicates the time taken to write the information, specified by the first "nvstore" instruction, to NVM 135. Line 212 indicates the time taken to write the information, specified by the second "nvstore" instruction, to NVM 135. Note that line 210 shows that the information specified by the first "nvstore" instruction is written to the NVM 135 sometime after the first "nvstore" instruction completes execution. Likewise, line 212 shows that the information specified by the second "nvstore" instruction is written to the NVM 135 sometime after the second "nvstore" instruction completes execution. Thus, the actual persistence of the information may be considered delayed in that the information may actually be persisted to NVM 135 at sometime after the "nvstore" instructions complete execution.

It should also be noted that the time taken to write information specified by the first "nvstore" instruction may overlap with the execution of the second "nvstore" instruction. Thus, employing delayed persistence may enable instruction execution to overlap with writing information to the NVM 135 and may thereby enhance performance of applications that utilize the "nvstore" instructions to store information in the NVM 135.

In addition to the above, lines 210 and 212 also indicate that the information specified by the first and second "nvstore" instructions is committed to NVM 135 by the time the "nvflush" instruction completes execution. In other words, the information written by the first and second "nvstore" instructions is guaranteed to be written into NVM 135 by the time the "nvflush" instruction completes execution. Thus, the "nvflush" instruction may be said to have immediately persisted the information to NVM 135.

One or more rules involving ordering may be associated with the above-described "nvstore" and "nvflush" instructions. For example, a first rule that may be associated with the above-described "nvstore" and "nvflush" instructions may indicate that information, specified by multiple "nvstore" instructions, is committed to NVM 135 in an order that the "nvstore" instructions are executed. Thus, in accordance with the first rule, in the above example, since the first "nvstore" instruction is executed prior to a second "nvstore" instruction, the information specified by the first "nvstore" instruction is committed to NVM 135 before the information specified by the second "nvstore" instruction is committed to NVM 135.

A second rule that may be associated with the above-described "nvstore" and "nvflush" instructions may indicate, for example, that a committing of information, specified by an "nvstore" instruction that executes prior to an "nvflush" instruction, may not be reordered such that the information is committed to NVM 135 after the "nvflush" instruction completes execution. Thus, in the above example, the first and second "nvstore" instructions are executed prior to the "nvflush" instruction. According to the second rule, in this example, information, specified by the first and second "nvflush" instructions, is committed to NVM 135 before the "nvflush" instruction completes execution. Further, in accordance with the second rule, committing the information, specified by the first and/or second "nvstore" instructions, to NVM 135 after the "nvflush" instruction completes execution would not be allowed.

The following example may be helpful in understanding the above example ordering rules. Referring back to FIG. 2, the first "nvstore" instruction executes before the second "nvstore" instruction. As noted above, the first "nvstore" instruction specifies that information represented by "A" is to be stored in location "$L_1$" in NVM 135. Likewise, the second "nvstore" instruction specifies that information represented by "B" is to be stored in location "$L_2$" in NVM 135. Now suppose, "$L_1$" and "$L_2$" are the same location in NVM 135. Following the first rule, the information represented by "A" would be stored in the location and later the information represented by "B" would be stored in the same location, overwriting the information represented by "A". If storing information in NVM 135 did not follow the first rule and the committing of information to NVM 135 specified by the first and second "nvstore" instructions could be reordered, the actual information that is written to the location in NVM 135 may be unknown. In other words, if reordering of the committing information to NVM 135 were allowed, it would be unclear as to whether the information specified by the second "nvstore" is overwritten by information specified by the first "nvstore" instruction or information specified by the first "nvstore" instruction is overwritten by information specified by the second "nvstore" instruction.

Regarding the second rule, in FIG. 2, the "nvflush" instruction follows the first and second "nvstore" instructions. Thus, information written by the first and second "nvstore" instructions is committed to NVM 135 at time $T_n$. If storing information in NVM 135 did not follow the second rule, it may not be clear when the information specified by the first and/or second "nvstore" instructions is actually written to NVM 135. For example, if information specified by the second "nvstore" instruction were to be committed to NVM 135 after the "nvflush" instruction completes execution, completion of execution of the "nvflush" instruction may not guarantee that the information written by the second "nvstore" instruction is actually committed to NVM 135.

Overlapping execution of operations that write to an NVM may be advantageous when implementing durable transactions. A durable transaction may include a transaction that involves storing information associated with the transaction in a durable medium, such as, for example NVM 135.

For example, consider the following code that includes a durable transaction that may store information in NVM 135:

```
begin_transaction
    nvstore varName, "John Q.";
    nvstore varSurname, "Public";
    nvstore varPhone, "555-0199";
end_transaction
nvflush
```

The transaction involves storing the values "John Q.", "Public", and "555-0199" in variables named "varName", "varSurname", and "varPhone", respectively, that are contained in NVM 135. The "nvflush" instruction following the transaction may be executed to ensure that the values are committed to the variables in NVM 135 before the "nvflush" completes execution. Thus, code that may follow the "nvflush" instruction may rely on the values being contained in the variables.

Note that since the "nvstore" instructions may delay persistence of the variables, the "nvstore" instructions may not indicate when the variables are actually persisted to NVM 135. Thus, until the "nvflush" instruction successfully completes execution, the transaction may not be considered committed to NVM 135.

In a delayed persistence scheme involving information written to NVM 135, a problem may arise if an event occurs that prevents the information from being committed to NVM 135. For example, suppose that computing device 100 is executing the above transaction when power is lost to the computing device 100 preventing execution of the "nvflush" instruction. Since the "nvflush" instruction was not executed, it may not be clear whether all the data in the transaction has been committed to NVM 135. Thus, the state of NVM 135 with respect to the transaction may be unknown.

One way to obviate problems that may arise when using delayed persistence when writing NVM 135 may be to maintain a log. The log may hold, for example, information that may be used to rollback the state of NVM 135 to a known state.

Figure 3:
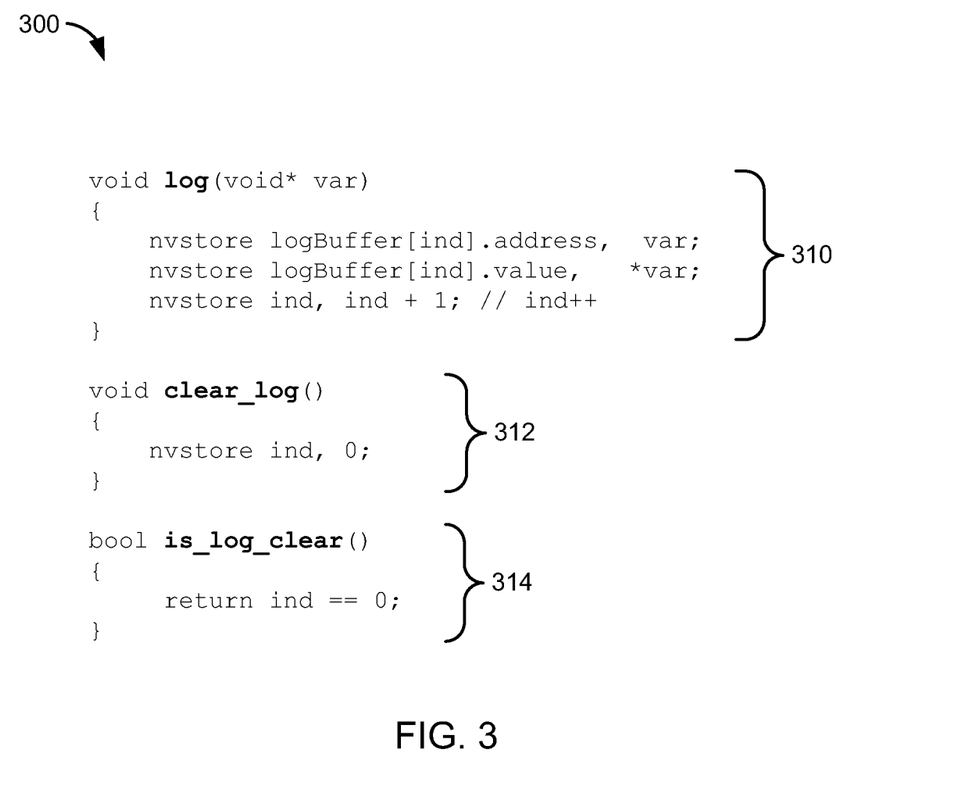
FIG. 3 illustrates example code that may be used to log information associated with a transaction.

FIG. 3 illustrates example code 300 that may be used to maintain a log that may hold information that may be used to rollback information contained in NVM 135. The code 300 may be included in, for example, APP 134 and/or OS 132 to log the rollback information. The information may be associated, for example, with one or more variables contained in data 138.

Referring to FIG. 3, code 300 includes a function named "log" 310, a function named "clear_log" 312, and a function named "is_log_clear" 314. Function 310 includes an input parameter that is an address of a variable. As will be described further below, the variable may be stored in NVM 135 using a delayed persistence operation, such as the above-described "nvstore" instruction. In function 310, the current value of the variable and the address of the variable is written to an entry in a log (named "logBuffer") using delayed persistence operations (in this example "nvstore" instructions). The log may be maintained in NVM 135 that may also hold the variable. The entry in the log is identified by the variable named "ind", which may also be contained in NVM 135. The value of "ind" is incremented to point to the next available entry in the log and the incremented value is written into "ind" using a delayed persistence operation.

It should be noted the "nvstore" instruction described herein is an example embodiment of a delayed persistence operation. Other embodiments of delayed persistence operations may be implemented in ways other than an instruction. For example, delayed persistence operations may be implemented in hardware that may not involve instructions.

In addition, it should be noted that other embodiments of delayed persistence operations may be implemented using instructions that may operate differently than the "nvstore" instruction described herein. For example, the "nvstore" instruction described herein writes a value to a location in NVM 135. Other embodiments of delayed persistence operations may include, for example, an instruction that may write multiple data values to multiple locations in NVM 135. Function 310 may employ such an instruction to write, for example, the address of the variable, the current value of the variable, and/or the value of "ind" in NVM 135.

The "clear_log" function 312 sets the variable named "ind" to a known value that indicates that log is cleared (i.e., the log does not contain any information). In this example, a value of zero indicates that the log is cleared. The "clear_log" function 312 sets the variable "ind" to zero using a delayed persistence operation.

The "is_log_clear" function 314 returns a result that indicates whether the log is cleared. Specifically, the "is_log_clear" function 314 reads the value of "ind" from NVM 135 and compares it to a known value that indicates the log is cleared (in this example zero). A Boolean result (e.g., TRUE, FALSE) of the comparison is returned by the function 314 based on a result of the comparison.

The above functions may be called in a transaction to log information that may be used, for example, to rollback a state of variables contained in NVM 135 that were written by the transaction using delayed persistence operations. The logged information may be used to recover from an event that may have prevented information written by the delayed persistence operations from being committed to NVM 135.

Figure 4:
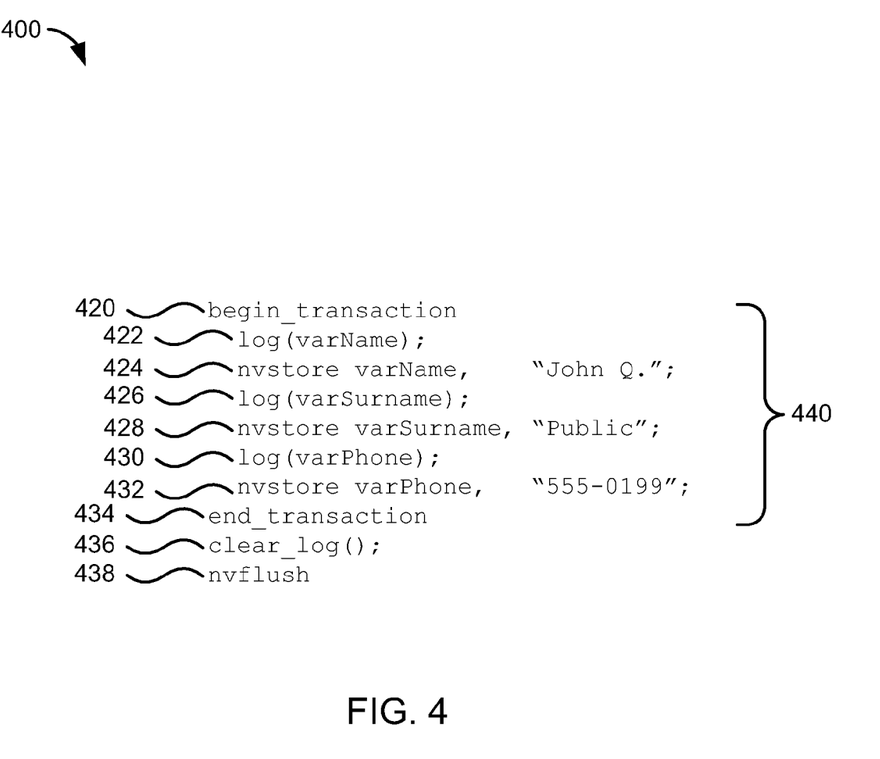
FIG. 4 illustrates example code that includes a transaction.

FIG. 4 illustrates example code 400 that includes code for logging information associated with a transaction 440. The code 400 may be included, for example, in APP 134 and/or OS 132. Referring to FIG. 4, the transaction 400 begins at line 420 and ends at line 434. At line 424 an "nvstore" instruction that is used to store the string "John Q." in a variable named "varName" in NVM 135. At line 428, an "nvstore" is used to store the string "Public" in a variable named "varSurname" in NVM 135 and at line 432, an "nvstore" is used to store the string "555-0199" in the variable named "varPhone" in NVM 135.

Lines 422, 426, and 430 log addresses and values of the variables "varName", "varSurname", and "varPhone". The values that are logged include the values of the variables before the "nvstore" instructions at lines 424, 428, and 432, respectively, are executed.

For example, suppose the variables "varName", "varSurname", and "varPhone" contained the values "Jane", "Doe", and "555-0100" in data 138 before the above "nvstore" instructions at lines 424, 428, and 432 are executed. The code at line 422 may cause an entry in log 136 to be created for the variable "varName" that contains the address of the variable "varName" and the value "Jane". Likewise, the code at line 426 may cause an entry in the log 136 to be created for the variable "varSurname" that contains the address of the variable "varSurname" and the value "Doe", and the code at line 430 may cause an entry in the log 136 to be created for the variable "varPhone" that contains the address of the variable "varPhone" and the value "555-0100". Note that the above three log entries are created using delayed persistence operations, which in this example are "nvstore" instructions.

At line 436, the function "clear_log" is called. As noted above, the "clear_log" function uses an "nvstore" instruction to set a variable named "ind" to a known value that indicates that log is cleared. At line 438, an "nvflush" instruction is executed. The "nvflush" instruction ensures that information specified by previous "nvstore" instructions is written to the NVM. Thus, in this example, after execution of the "nvflush" instruction, the variables "varName", "varSurname", and "varPhone" in NVM 135 contain the values "John Q.", "Public", and "555-0199", respectively. Moreover, the variable "ind" in NVM 135 contains the value "0" thus indicating the log is cleared.

Figure 5:
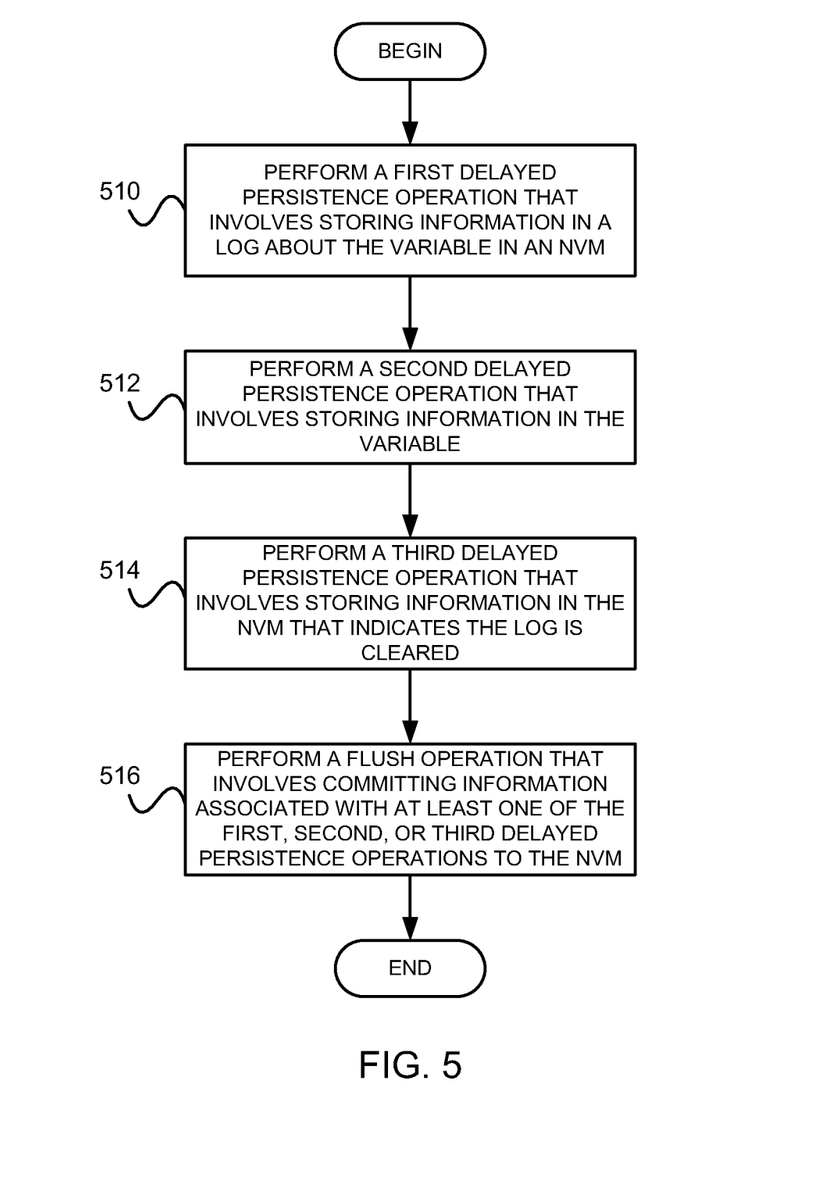
FIG. 5 illustrates a flow diagram of example acts that may be used to store information in an non-volatile memory (NVM)

FIG. 5 illustrates a flow diagram of example acts that may be used to store information in a variable contained in an NVM. Referring to FIG. 5, at block 510, a first delayed persistence operation that involves storing information about the variable in a log may be performed. For example, the variable and log may be contained in NVM 135. The delayed persistence operation may include the above-described "nvstore" instruction. Performing the delayed persistence operation may include executing the "nvstore" instruction. The information stored in the log may include a location of the variable (e.g., the address of the variable) in NVM 135 and a current value of the variable. The log may be capable of containing multiple entries and the information may be store in an entry contained in the log.

At block 512, a second delayed persistence operation that involves storing information in the variable may be performed. For example, the second delayed persistence operation may include an "nvstore" instruction and performing the operation may include executing the instruction. Executing the instruction may include storing the information in the variable using delayed persistence. The information that is stored may overwrite existing information that may be contained in the variable.

At block 514, a third delayed persistence operation that involves storing information in the NVM that indicates the log is cleared is performed. For example, the third delayed persistence operation may also be an "nvstore" operation and performing the operation may include executing the instruction. Executing the "nvstore" instruction may include storing a value in a second variable in NVM 135 that indicates the log is cleared. Here, for example, the second variable may hold an index that points to a "next available entry" in the log. Setting the second variable to point to a particular entry (e.g., the first entry) in the log may provide an indication that the log is cleared. Note that other ways for indicating the log is cleared may be used. For example, the second variable may indicate a number of entries in the log and setting the second variable to a known value (e.g., zero) may indicate the log is cleared. Likewise, for example, the second variable may include a flag that may be set to indicate whether the log is cleared.

At block 516, a flush operation that involves committing information associated with at least one of the first, second, or third delayed persistence operations is performed. For example, suppose that the first, second, and third delayed persistence operations include executing "nvstore" instructions that store information in NVM 135, such as described above. Further, suppose, for example, that the information associated with the first delayed persistence operation has been written to NVM 135 but the information associated with the second and third delayed persistence operations have not been written to NVM 135. The information associated with the second and third delayed persistence operations may be considered "outstanding" in that the information has not yet been written to NVM 135. The flush operation performed at block 516 may write the outstanding information to NVM 135.

Information contained in the above-described log may be used to recover from a situation where information associated with a transaction may not be completely committed to an NVM. For example, referring back to FIG. 4, suppose computing device 100 is executing code 400 to store information associated with transaction 440 in NVM 135. Now suppose, for example, that a failure condition (e.g., a power failure, a hardware failure) occurs that causes execution of code 400 to suddenly halt prior to the execution of the "nvflush" instruction at line 438. The state of NVM 135 may be unknown because it may not be clear whether the information associated with "nvstore" instructions contained in the transaction has actually been committed to NVM 135 due to the delayed persistence nature of the "nvstore" instructions. The above-described log may be used to recover from the failure condition and restore information in NVM 135.

Figure 6:
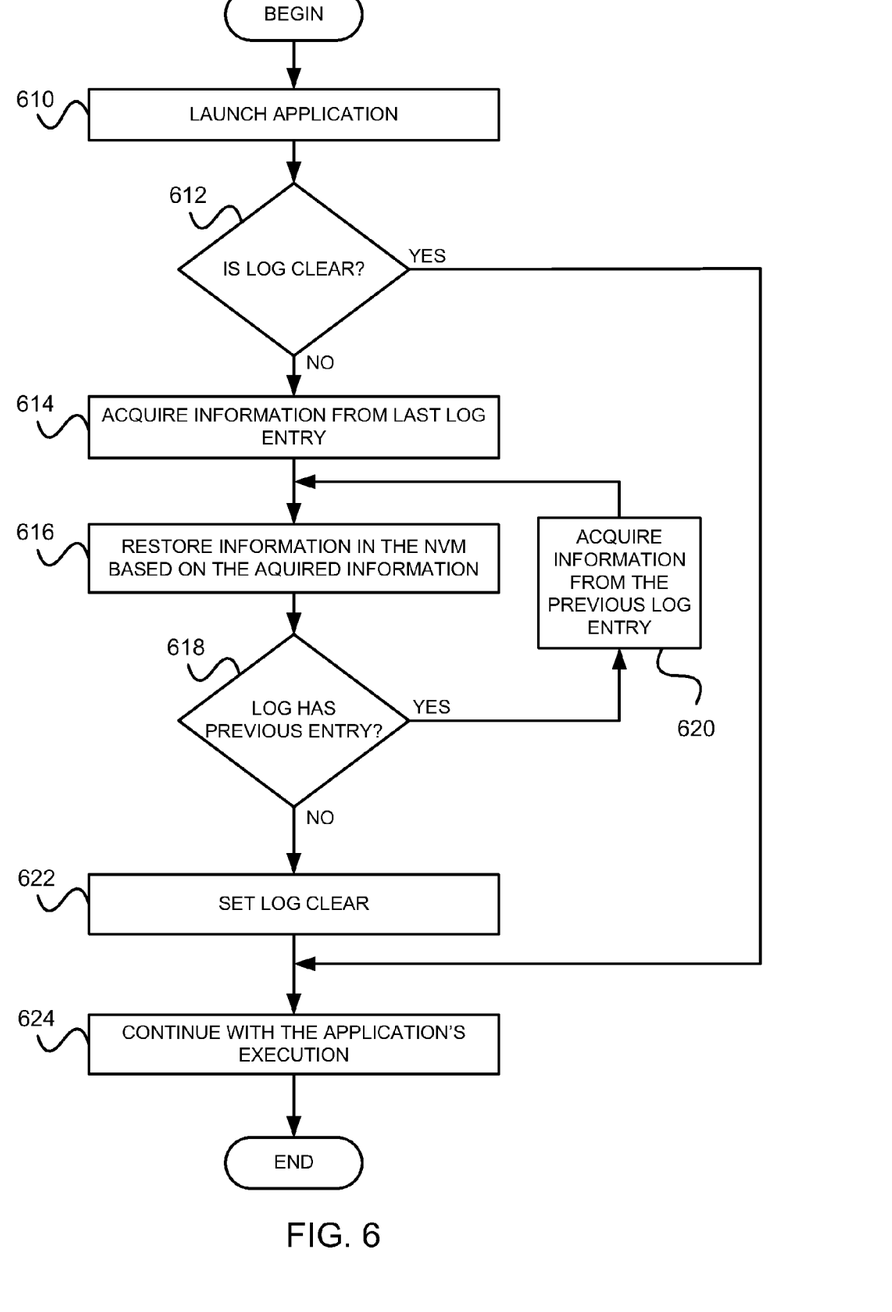
FIG. 6 illustrates a flow diagram of example acts that may be used to restore information to an NVM from information contained in a log.

FIG. 6 illustrates a flow chart of example acts that may be used to utilize the above-described log to recover from a failure condition that may occur during an application's execution and restore information in an NVM based on information contained in the log. Referring to FIG. 6, at block 610, the application may be launched as part of a recovery action that may be taken to recover from the failure condition.

Launching the application after the failure condition may cause the application to enter a recovery state.

At block 612, a check may be performed to determine whether the log is clear. A variable may be maintained in the NVM that may indicate whether the log is clear. For example, the above-described variable "ind" may be maintained in the NVM. Setting the variable to a value of zero may provide an indication that the log is clear. At block 612, a check may be performed to determine whether the variable "ind" indicates the log is clear.

If at block 612 it is determined that the log is clear, at block 624 application execution may continue. The log being cleared may indicate that there is no information in the log to restore to the NVM. If at block 612, it is determined that the log is not cleared, at block 614, information from the last log entry may be acquired.

At block 616, data in the NVM may be restored based on the information acquired from the log entry. For example, information acquired from the log entry may include a location and value of a variable in the NVM. The value of the variable may be restored in the NVM by writing the acquired value to the NVM at the acquired location. The acquired value may be written to the NVM using a delayed persistence operation.

At block 618, a check may be performed to determine whether the log contains a previous entry. If at block 618 it is determined that the log does not contain a previous entry, at block 622 the log may be set to indicate the log is cleared and at block 624 execution of the application may continue. Otherwise, if at block 618 it is determined that the log contains a previous entry, at block 620, information from the previous entry is acquired. Control then proceeds to block 616. Note that acts at blocks 616 through 620 may be repeated for remaining entries in the log.

The foregoing description of embodiments is intended to provide illustration and description, but is not intended to be exhaustive or to limit the invention to the precise form disclosed. Modifications and variations are possible in light of the above teachings or may be acquired from practice of the invention. For example, while a series of acts has been described above with respect to FIGS. 5 and 6, the order of the acts may be modified in other implementations. Further, non-dependent acts may be performed in parallel.

Also, the term "user", as used herein, is intended to be broadly interpreted to include, for example, a computing device (e.g., fixed computing device, mobile computing device) or a user of a computing device, unless otherwise stated.

It will be apparent that one or more embodiments, described herein, may be implemented in many different forms of software and/or hardware. Software code and/or specialized hardware used to implement embodiments described herein is not limiting of the invention. Thus, the operation and behavior of embodiments were described without reference to the specific software code and/or specialized hardware—it being understood that one would be able to design software and/or hardware to implement the embodiments based on the description herein.

Further, certain features of the invention may be implemented using computer-executable instructions that may be executed by processing logic, such as processing logic 120. The computer-executable instructions may be stored on one or more non-transitory tangible computer-readable storage media. The media may be volatile or non-volatile and may include, for example, DRAM, SRAM, flash memories, removable disks, non-removable disks, and so on.

No element, act, or instruction used herein should be construed as critical or essential to the invention unless explicitly described as such. Also, as used herein, the article "a" is intended to include one or more items. Where only one item is intended, the term "one" or similar language is used. Further, the phrase "based on" is intended to mean "based on, at least in part, on" unless explicitly stated otherwise.

It is intended that the invention not be limited to the particular embodiments disclosed above, but that the invention will include any and all particular embodiments and equivalents falling within the scope of the following appended claims.

What is claimed is:

1. A method comprising:
performing a first delayed persistence operation to store information in a log contained in a non-volatile memory (NVM), the information including a current value of a variable contained in the NVM;
performing a second delayed persistence operation to store information in the variable;
performing a third delayed persistence operation to store information in the NVM that indicates the log is cleared; and
performing a flush operation to commit information associated with at least one of the first, second, or third delayed persistence operations to the NVM.

2. The method of claim 1, wherein the information stored by the first delayed persistence operation further includes an address of the variable.

3. The method of claim 1, wherein the information stored by the third delayed persistence operation is stored in a variable contained in the NVM that indicates a next entry in the log.

4. The method of claim 1, wherein the information stored by the third delayed persistence operation is stored in a variable contained in the NVM that indicates a number of entries in the log.

5. The method of claim 1, wherein the information stored by the third delayed persistence operation includes a flag that indicates whether the log is cleared.

6. The method of claim 1, wherein the at least one of the first, second, or third delayed persistence operation includes an executable instruction that is executable by processing logic.

7. The method of claim 6, wherein the instruction is executed to perform at least one of the first, second, or third delayed persistence operations.

8. One or more tangible non-transitory computer-readable mediums storing one or more executable instructions for execution by processing logic, the one or more executable instructions including:
one or more executable instructions for storing information in a log contained in a non-volatile memory (NVM) using a first delayed persistence operation, the information including a current value of a variable contained in the NVM;
one or more executable instructions for storing information in the variable using a second delayed persistence operation;
one or more executable instructions for storing information in the NVM that indicates the log is cleared using a third delayed persistence operation; and
one or more executable instructions for committing outstanding information to the NVM, the outstanding information including information associated with at least one of the first, second, or third delayed persistence operations.

9. The medium of claim 8, wherein the information stored by the first delayed persistence operation further includes an address of the variable.

10. The medium of claim 8, wherein the information stored by the third delayed persistence operation is stored in a variable contained in the NVM that indicates a next entry in the log.

11. The medium of claim 8, wherein the information stored by the third delayed persistence operation is stored in a variable contained in the NVM that indicates a number of entries in the log.

12. The medium of claim 8, wherein the further comprising:
one or more instructions for determining that the log is not cleared;
one or more instructions for acquiring the information stored by the second delayed persistence operation from the log; and
one or more instructions for restoring information contained in the variable based on the acquired information.

13. The medium of claim 12, wherein the information in the variable is restored by using a delayed persistence operation that writes the acquired information to the variable.

14. A system comprising:
processing logic for:
performing a first operation that stores information in a log contained in a non-volatile memory (NVM) using delayed persistence operation, the information including a current value of a storage location contained in the NVM;
performing a second operation that stores information in the storage location using delayed persistence;
performing a third operation that stores information in the NVM that indicates the log is cleared using delayed persistence; and
committing outstanding information to the NVM, the outstanding information including information associated with at least one of the first, second, or third operations.

15. The system of claim 14, wherein the information stored by the first operation further includes an address of the variable.

16. The system of claim 14, wherein the information stored by the third operation is stored in a variable contained in the NVM that indicates a next entry in the log.

17. The system of claim 14, wherein the information stored by the third operation is stored in a variable contained in the NVM that indicates a number of entries in the log.

18. The system of claim 14, wherein the information stored by the third operation includes a flag that indicates whether the log is cleared.

19. The system of claim 14, wherein the at least one of the first, second, or third delayed operations includes an executable instruction that is executable by processing logic.

20. The system of claim 19, wherein the instruction is executed to perform at least one of the first, second, or third operations.

* * * * *